(12) United States Patent
Narayanan et al.

(10) Patent No.: US 12,386,884 B1
(45) Date of Patent: Aug. 12, 2025

(54) SYSTEM AND METHOD FOR RETRIEVING A THREE-DIMENSIONAL (3D) OBJECT USING A SELF-SUPERVISED MODEL

(71) Applicant: International Institute of Information Technology, Hyderabad, Hyderabad (IN)

(72) Inventors: P. J. Narayanan, Hyderabad (IN); Prayushi Mathur, Kota (IN); Kajal Sanklecha, Jalgaon (IN)

(73) Assignee: International Institute of Information Technology, Hyderabad, Hyderabad (IN)

( * ) Notice: Subject to any disclaimer, the term of this patent is extended or adjusted under 35 U.S.C. 154(b) by 0 days.

(21) Appl. No.: 18/811,535

(22) Filed: Aug. 21, 2024

(30) Foreign Application Priority Data

Nov. 17, 2023 (IN) .............................. 202341078069

(51) Int. Cl.
*G06F 16/00* (2019.01)
*G06F 16/2457* (2019.01)
*G06F 16/44* (2019.01)
*G06F 16/532* (2019.01)
*G06N 3/088* (2023.01)

(52) U.S. Cl.
CPC ...... *G06F 16/532* (2019.01); *G06F 16/24578* (2019.01); *G06F 16/444* (2019.01); *G06N 3/088* (2013.01)

(58) Field of Classification Search
CPC .................................................... G06F 16/444
See application file for complete search history.

(56) References Cited

U.S. PATENT DOCUMENTS

2022/0139037 A1\* 5/2022 Li .......................... G06V 10/26
345/419

\* cited by examiner

*Primary Examiner* — Ajith Jacob

(57) ABSTRACT

A system and processor-implemented method for three-dimensional (3D) object retrieval using a self-supervised model is provided. The present system learns an embedding space of the 3D mesh objects in a self-supervised manner without the need for objects annotated with their class or other properties. Effective embeddings of 3D mesh objects are learned using the self-supervised method for ranked retrieval from a large collection of 3D objects. A simple representation of mesh objects and a standard neural network model is used to learn the embedding. The results are retrieved on the basis of the shape of the object which may not belong to the same category but look similar in shape using the embeddings generated by self-supervised model. The system is independent of class labels and uses the entire 3D model for better information extraction.

15 Claims, 10 Drawing Sheets

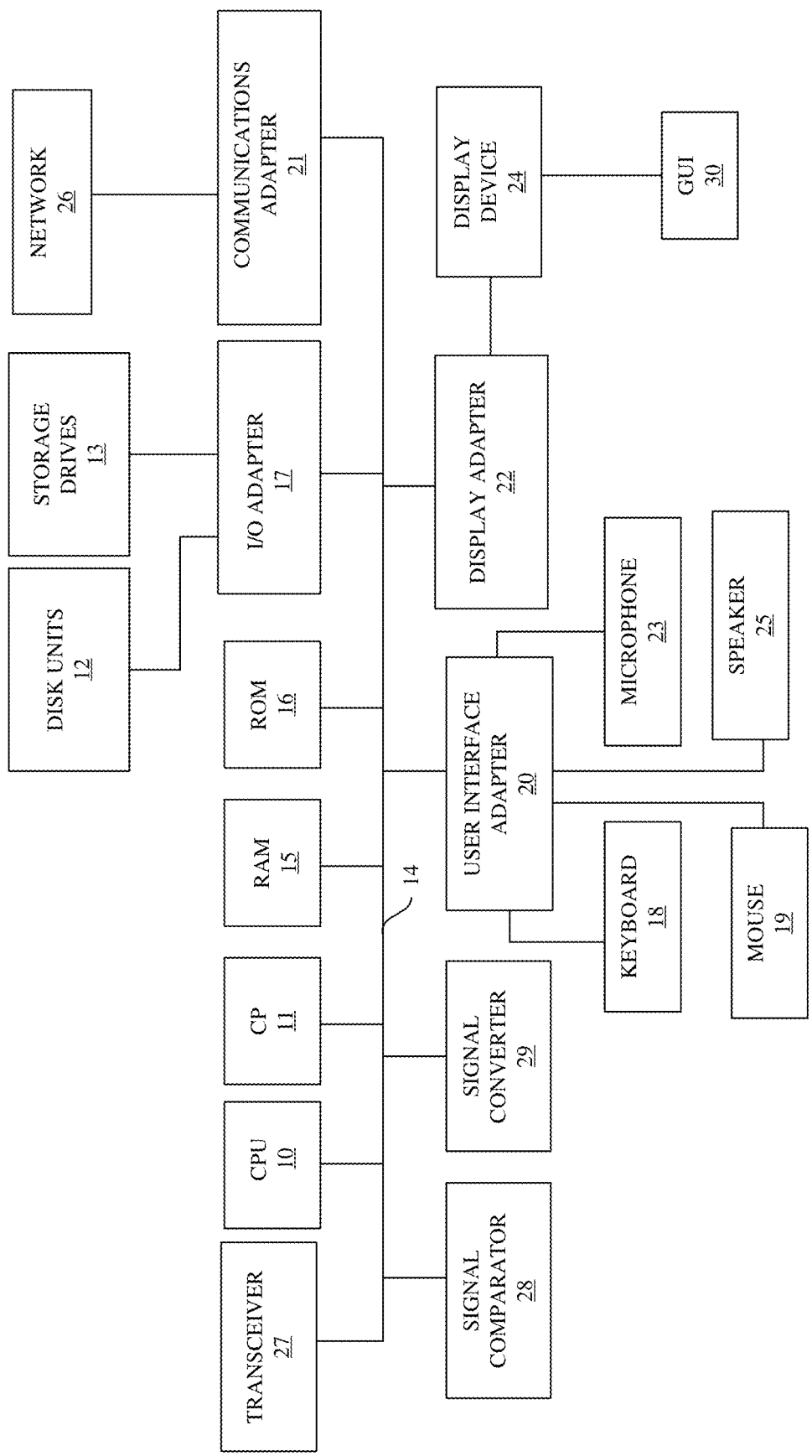

SYSTEM AND METHOD FOR RETRIEVING A THREE-DIMENSIONAL (3D) OBJECT USING A SELF-SUPERVISED MODEL

BACKGROUND

Technical Field

The embodiments herein generally relate to a system and a method for retrieving a three-dimensional (3D) object in a database of 3D objects, and more particularly to a self-supervised method to learn effective embeddings of 3D mesh objects for ranked retrieval of 3D objects.

Description of the Related Art

Digitally represented 3D models are used widely for designing, visualizing and communicating complex objects and environments. The use of digital 3D models has become increasingly important in various fields such as virtual and augmented reality, gaming, medical imaging, design, scientific visualization, training, education, etc. As the trend continues, the demand for models of greater variety and detail will increase in the future. Advanced authoring tools are the major source of creating rich 3D models. Computer Vision algorithms are employed increasingly to capture complex models from the world using regular and depth cameras. For 3D models, the triangle or polygon mesh representation is the most common and versatile, though point clouds, implicit surfaces, voxels, signed distance fields, etc., have also found applications in several situations.

Rich tools and techniques to create, process, analyse, and render 3D models are available today. However, efforts to search and retrieve similar objects from a collection of 3D models given a query model lag behind such efforts involving other digital assets. Large numbers of 3D models are accessible via the internet and in specialised databases today and the collections are growing rapidly. A large number of 3D models, mostly represented as triangular meshes, are available on repositories such as Thingiverse, GrabCAD, Sketchfab, TurboSquid and 3D Warehouse. Several open 3D datasets are available including ModelNet40, ShapeNet, CADSketchNet and ObjectNet3D.

Early methods for retrieval of 3D objects used hand-designed descriptors computed from the geometric data, such as Spin Images, Heat Kernel Signatures, etc. Descriptors based on activations of neural networks have become dominant. However, the related problems of classification and recognition of 3D models have got more attention. Supervised methods for retrieval cannot scale up due to the effort involved in annotation. Current 3D retrieval methods can be categorized into view-based and model-based methods. The view-based methods deploy the Siamese network directly on multi-view images of the 3D object. But view-based methods take only two dimensions of the three-dimension information of the object available which results in data loss.

Accordingly, there remains a need for addressing the aforementioned technical drawbacks in existing technologies for a self-supervised system for the 3D retrieval task along the lines of image retrieval, document retrieval, classification or summarization.

SUMMARY

In view of the foregoing, an embodiment herein provides system for retrieving a three-dimensional (3D) object using a self-supervised model. The system includes a user device and a 3D object retrieval server. The 3D object retrieval server is communicatively connected with the user device through a network. The 3D object retrieval server includes a memory and a processor. The processor is configured to process an input data including a query object received from the user device. The query object includes a 3D model of the object. The processor is configured to pre-process the 3D model of the query object to fit into a unit sphere, as a triangular mesh, by reducing a number of triangles in the 3D model to a pre-defined number of triangles to reduce the size of the 3D model. The processor is configured to represent each triangle of the triangular mesh including a descriptor as a 2 dimensional (2D) matrix by generating the 2D matrix that represents the 3D model including the 3D model of the object. A number of rows in the 2D matrix is equal to a number of faces in the 3D model being encoded. The processor is configured to employ a neural network model, implemented in a self-supervised network, to learn feature vectors in a embedding space representing the 3D model of the query object. The neural network model is trained, using the self-supervised network, to embed a plurality of historical 3D models associated with a plurality of historical query objects stored in a database by feeding them through the self-supervised network to obtain their representations in the embedding space for learning. The processor is configured to retrieve, using the learned embedding space, one or more objects that are geometrically similar to the query object from the database by embedding the pre-processed 3D model of the query object.

In some embodiments, the descriptor includes a centre of the triangle, corners of the triangle and an unit normal vector of the triangle. The x, y, z coordinates of the centre of the triangle represent a global structure of the 3D model in the 3D space. The x, y, z coordinates of the triangle represent the three corners of the triangle, and the x, y, z coordinates of the unit normal vector directed outwards from the 3D object.

In some embodiments, the learned embedding space processes a large number of datasets efficiently using a nearest neighbour search technique.

In some embodiments, the system retrieves the object that is geometrically similar to the query object by preparing a dataset of inputs and their corresponding feature vectors, generating an embedding vector for each 3D model associated with each object stored in the database, and retrieving the object that is geometrically similar to the query object by embedding the 3D model of the query object and searching the database to determine the object that is similar to the query object.

In some embodiments, the system sorts the one or more retrieved objects using a distance metric to a pre-processed query input representation, and provides top-ranked retrieved object as the retrieval object. The similar objects are represented as vectors that are close to each other in the embedding space, while dissimilar objects are represented far apart.

In one aspect, a method for retrieving a three-dimensional (3D) object using a self-supervised model of a system is provided. The method includes (i) processing, using a processor of a system, an input data including a query object received from the user device, wherein the query object includes a 3D model of the object, (ii) pre-processing, using the processor, the 3D model of the query object to fit into a unit sphere, as a triangular mesh, by reducing a number of triangle in the 3D model to a pre-defined number of triangles to reduce the size of the 3D model, (iii) representing, using the processor, each triangle of the triangular mesh including a descriptor as a 2 dimensional (2D) matrix by generating the 2D matrix that represents the 3D model including the 3D model of the object, wherein a number of rows in the 2D matrix is equal to a number of faces in the 3D model being encoded, (iv) employing, using the processor, a neural network model, implemented in a self-supervised network, to learn feature vectors in an embedding space representing the 3D model of the query object, wherein the neural network model is trained, using the self-supervised network, to embed a plurality of historical 3D models associated with a plurality of historical query objects stored in a database by feeding them through the self-supervised network to obtain their representations in the embedding space for learning, and (v) retrieving, using the processor, using the learned embedding space, one or more objects that are geometrically similar to the query object from the database by embedding the pre-processed 3D model of the query object.

In some embodiments, the descriptor includes a centre of the triangle, corners of the triangle, and an unit normal vector of the triangle, wherein x, y, z coordinates of the centre of the triangle represent a global structure of the 3D model in the 3D space, wherein x, y, z coordinates of the triangle represent the three corners of the triangle, and wherein x, y, z coordinates of the unit normal vector directed outwards from the 3D object.

In some embodiments, the learned embedding space processes a large number of datasets efficiently using a nearest neighbour search technique.

In some embodiments, the method includes retrieving the object that is geometrically similar to the query object by preparing a dataset of inputs and their corresponding feature vectors, generating an embedding vector for each 3D model associated with each object stored in the database, and retrieving the object that is geometrically similar to the query object by embedding the 3D model of the query object and searching the database to determine the object that is similar to the query object.

In some embodiments, the method includes sorting the plurality of retrieved objects using a distance metric to a pre-processed query input representation, and provides top-ranked retrieved object as the retrieval object, wherein similar objects are represented as vectors that are close to each other in the embedding space, while dissimilar objects are far apart.

In another aspect, one or more non-transitory computer-readable storage mediums storing one or sequences of instructions, which when executed by one or more processors, causes a method for retrieving a three-dimensional (3D) object using a self-supervised model of a system. The method for retrieving a three-dimensional (3D) object using a self-supervised model of a system is provided. The method includes (i) processing, using a processor of a system, an input data including a query object received from the user device, wherein the query object includes a 3D model of the object, (ii) pre-processing, using the processor, the 3D model of the query object to fit into a unit sphere, as a triangular mesh, by reducing a number of triangle in the 3D model to a pre-defined number of triangles to reduce the size of the 3D model, (iii) representing, using the processor, each triangle of the triangular mesh including a descriptor as a 2 dimensional (2D) matrix by generating the 2D matrix that represents the 3D model including the 3D model of the object, wherein a number of rows in the 2D matrix is equal to a number of faces in the 3D model being encoded, (iv) employing, using the processor, a neural network model, implemented in a self-supervised network, to learn feature vectors in an embedding space representing the 3D model of the query object, wherein the neural network model is trained, using the self-supervised network, to embed a plurality of historical 3D models associated with a plurality of historical query objects stored in a database by feeding them through the self-supervised network to obtain their representations in the embedding space for learning, and (v) retrieving, using the processor, using the learned embedding space, one or more objects that are geometrically similar to the query object from the database by embedding the pre-processed 3D model of the query object.

In some embodiments, one or more non-transitory computer-readable storage mediums store one or sequences of instructions, which when executed by one or more processors, the descriptor includes a centre of the triangle, corners of the triangle, and an unit normal vector of the triangle, wherein x, y, z coordinates of the centre of the triangle represent a global structure of the 3D model in the 3D space, wherein x, y, z coordinates of the triangle represent the three corners of the triangle, and wherein x, y, z coordinates of the unit normal vector directed outwards from the 3D object.

In some embodiments, one or more non-transitory computer-readable storage mediums store one or sequences of instructions, which when executed by one or more processors, the learned embedding space processes a large number of datasets efficiently using a nearest neighbour search technique.

In some embodiments, one or more non-transitory computer-readable storage mediums storing one or sequences of instructions, which when executed by one or more processors, further include retrieving the object that is geometrically similar to the query object by preparing a dataset of inputs and their corresponding feature vectors, generating an embedding vector for each 3D model associated with each object stored in the database, and retrieving the object that is geometrically similar to the query object by embedding the 3D model of the query object and searching the database to determine the object that is similar to the query object.

In some embodiments, one or more non-transitory computer-readable storage mediums store one or sequences of instructions, which when executed by one or more processors, further include sorting the plurality of retrieved objects using a distance metric to a pre-processed query input representation, and provides top-ranked retrieved object as the retrieval object, wherein similar objects are represented as vectors that are close to each other in the embedding space, while dissimilar objects are far apart.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 10 is a schematic diagram of a computer architecture in accordance with the embodiments herein.

DETAILED DESCRIPTION OF PREFERRED EMBODIMENTS

Figure 1:
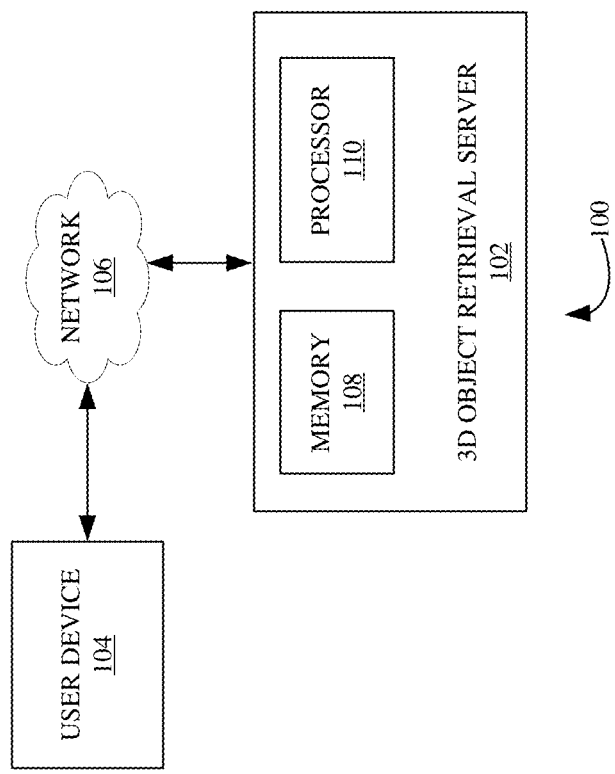
FIG. 1 illustrates a system for three-dimensional (3D) object retrieval using a self-supervised model according to some embodiments herein.

The embodiments herein and the various features and advantageous details thereof are explained more fully with reference to the non-limiting embodiments that are illustrated in the accompanying drawings and detailed in the following description. Descriptions of well-known components and processing models are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and a method for 3D object retrieval using a self-supervised model. The present invention provides a self-supervised method to learn effective embeddings of 3D mesh objects for ranked retrieval from a collection of such objects. The present invention employs a simple representation of mesh objects and a standard neural network model to learn the embedding. Referring now to the drawings, and more particularly to FIGS. 1 through 10, where similar reference characters denote corresponding features consistently throughout the figure's, preferred embodiments are shown.

FIG. 1 illustrates a system 100 for three-dimensional (3D) object retrieval using a self-supervised model according to some embodiments herein. The system 100 includes a 3D object retrieval server 102 that is communicatively connected with a user device 104 through a network 106. The network 106 is a wireless network or wired network. The 3D object retrieval server 102 includes a memory 108 and a processor 110. The memory 108 stores a set of instructions. The processor 110 executes the set of instructions. The processor 110 is configured to process an input data including a query object received from the user device 104. The query object includes a 3D model of the object. The processor 110 is configured to pre-process the 3D model of the query object to fit into a unit sphere, as a triangular mesh, by reducing a number of triangles in the 3D model to a pre-defined number of triangles to reduce the size of the 3D model. The processor 110 is configured to represent each triangle of the triangular mesh including a descriptor as a 2 dimensional (2D) matrix by generating the 2D matrix that represents the 3D model including the 3D model of the object. A number of rows in the 2D matrix is equal to a number of faces in the 3D model being encoded. The processor 110 is configured to employ a neural network model, implemented in a self-supervised network, to learn feature vectors in a embedding space representing the 3D model of the query object. The neural network model is trained, using the self-supervised network, to embed a plurality of historical 3D models associated with a plurality of historical query objects stored in a database by feeding them through the self-supervised network to obtain their representations in the embedding space for learning. The processor 110 is configured to retrieve, using the learned embedding space, one or more objects that are geometrically similar to the query object from the database by embedding the pre-processed 3D model of the query object. For example, the pre-defined number of triangles may be 512, 1024, etc.

The 3D object retrieval server 102 is configured to pre-process the 3D model of the query object to fit into a unit sphere and reduce to the pre-defined number of triangles. In some embodiments, each face of the triangular mesh is represented using the representation of the 3D object which includes the coordinates of the centre, corners, and normal of the triangles. In some embodiments, a rich mesh representation of the 3D model includes a large number of triangles. The number of triangles in each mesh is reduced to the pre-defined number of triangles, thereby reducing the size of the mesh and the computational cost. The triangle mesh is normalized in size to fit into a unit sphere. The centre of the object may be shifted to the origin of the triangle. To generalize all the meshes, each mesh is decimated to reduce the size of the mesh and the computational cost. Decimation also helps to concentrate on the major shape properties, overlooking fine local variations.

The 3D object retrieval server 102 is configured to represent each triangle of the mesh including properties of the triangle of the 3D model. The two-dimensional (2D) matrix representing the 3D object is generated. The number of rows in the 2D matrix is equal to the number of faces in the 3D model being encoded.

In some embodiments, the descriptor includes a centre of the triangle, corners of the triangle and an unit normal vector of the triangle. The x, y, z coordinates of the centre of the triangle represent a global structure of the 3D model in the 3D space. The x, y, z coordinates of the triangle represent the three corners of the triangle, and the x, y, z coordinates of the unit normal vector directed outwards from the 3D object.

The 3D object retrieval server 102 is configured to employ a self-supervised network to learn the embedding, which is used to create a database of embeddings. The self-supervised network is used to embed query objects. The objects can be ranked and retrieved solely based on geometric similarity to the query object. A suitable embedding is learned for the collection of mesh objects in the collection of databases using the self-supervised network. For model-based 3D object retrieval, feature vectors are learned in embedding space representing the whole mesh object. To learn the embeddings, the simple self-supervised network based on the Siamese network architecture is used. In the image domain, the deep neural networks are used for recognition and retrieval. In some embodiments, the learned embedding space processes a large number of datasets efficiently using a nearest neighbour search technique.

In some embodiments, the system 100 retrieves the object that is geometrically similar to the query object by preparing a dataset of inputs and their corresponding feature vectors, generating an embedding vector for each 3D model associated with each object stored in the database, and retrieving the object that is geometrically similar to the query object by embedding the 3D model of the query object and searching the database to determine the object that is similar to the query object.

In some embodiments, the system 100 sorts the one or more retrieved objects using to a pre-processed query input representation, and provides top-ranked retrieved object as the retrieval object. The similar objects are represented as vectors that are close to each other in the embedding space, while dissimilar objects are represented far apart.

The 3D object retrieval server 102 is configured to retrieve the results using the learned embedding space that can handle large datasets efficiently by using nearest neighbour search techniques that scale well with the size of the dataset. Once the self-supervised network is trained, all objects of the database are embedded by feeding them through the self-supervised network to obtain their representations in the embedding space. The object retrieval process is divided into database generation and retrieval. The database generation for retrieval using embedding space includes preparing a dataset of inputs and their corresponding feature vectors, which can be used to perform efficient retrieval of similar inputs. To generate the database, the self-supervised network is used to obtain the embedding vector for each 3D object. Retrieval is performed by embedding the pre-processed query 3D model and searching the database to find objects closest to the query. The retrieved inputs are then sorted by a distance metric to the pre-processed query input representation, and the top-ranked results are returned as the retrieval results. Similar inputs are represented close to each other in the embedding space, while dissimilar inputs are represented far apart.

In an exemplary embodiment, a 3D object dataset is used for the 3D object retrieval. It includes, for example, 12,311 labelled 3D mesh objects of 40 common categories. All the objects in the original dataset are in Object File Format (OFF). The number of faces in each of the 3D model can go as high as, for example, 1,451,244 faces. This can lead to high computational complexity. Therefore, the dataset is pre-processed to contain pre-defined number of triangles. The approximate train-test split of the dataset is 80%-20%.

The training dataset is used for training the model for database generation for a sufficient number of epochs. Once trained, the embeddings of all the database objects are saved for query retrieval. For the experiments during random rotation, the input is randomly rotated within a given range of angles whereas the target is the object in its original orientation. During the object retrieval process, a query object is passed through the trained neural network model which generates an embedding of the query object for further comparison and retrieval. Top-k (generally, k=5, 10) mean average precision (mAP) scores are generated on the basis of ranked retrieval of the object. In the object retrieval, the query object is the input object for which the user needs potential matches. The retrieved object instances from the model are ranked based on their similarity to the query object and the top-ranked objects are returned as the results.

Table 1 shows the mean average precision (mAP) score obtained on retrieving the top-10 results using the system 100. The mean average precision (mAP) score obtained on retrieving the top-10 results for the test dataset is 87.88% on top-10 and 94.87% on top-5 results. Table 1 compares the overall classification accuracy and retrieval results (mAP scores) for different methods on the test dataset.

TABLE 1

| Method | Modality | Classification accuracy (%) | Map (%) |
| --- | --- | --- | --- |
| Method that need supervision ||||
| LFD | Voxels | 75.5 | 40.9 |
| MVCNN | Multi view | 90.1 | 80.2 |
| 3D ShapeNets | Voxels | Voxels | Voxels |
|  | 77.3 49.2 | 77.3 49.2 | 77.3 49.2 |
| GIFT | Multiview | — | 81.9 |
| PointNet | Points | 89.2 | — |
| PointNet++ | Points | 90.7 | — |
| PointCNN | Points | 91.8 |  |
| PVNet | Points | 93.2 | 88.5 |
| MLVCNN | Multiview | 94.2 | 92.2 |
| DensePoint | Points | 93.2 | 88.5 |
| MeshNet | Mesh | 88.9 | 81.9 |
| Meshnet++ | Mesh | 91.6 |  |
| MVTN | Multiview | 93.8 | 92.9 |
| MeshMAE | Mesh | 92.5 |  |
| Methods that need no supervision ||||
| Top-10 | Mesh |  | 87.88 |
| Top-5 | Mesh |  | 94.87 |

Table 2 shows the performance of the system 100 while learning on varying number of epochs and random rotation. Table 2 shows the results on the test dataset for two random rotations (top) and for different training iterations (bottom).

TABLE 2

| | | mAP | |
| --- | --- | --- | --- |
| Experiment | | Top-5 | Top-10 |
| Random Rotation | 0 | 0.9487 | 0.8788 |
|  | 30 | 0.9516 | 0.8825 |
| Number of epochs | 50 | 0.9398 | 0.8702 |
|  | 100 | 0.9453 | 08757 |
|  | 150 | 0.9487 | 0.8788 |

Apart from the triangle properties of the mesh faces, vectors are included in points in the neighbouring faces. The self-supervised model for retrieval doesn't learn the embeddings well when the neighbour vectors are provided as backed by the results shown in Table 3. Table 3 shows the results of various ablation studies. Based on these results, fixed dimensional embeddings are chosen and no neighbours to represent each triangle. The neural network model tries to learn the entire input given by adjusting the weights according to back-propagation. When neighbouring vectors are included in the input representation, the model becomes confused because these neighbouring vectors occupy a larger portion of the input representation. This is because the positional information of a face like properties of triangles give more information about the structure of the 3D model. Experiments are performed by changing various parameters as mentioned in Table 3. As a result, a fixed feature vector length are determined on a without neighbouring vector representation giving best retrieval results when compared using Euclidean distance.

TABLE 3

|  | Experiment | Top-5 | Top-10 |
|---|---|---|---|
| Embedding Vector Dimension | 128 | 0.9463 | 0.8591 |
| | 256 | 0.9478 | 0.8621 |
| | 512 | 0.9476 | 0.8635 |
| | 1024 | 0.9471 | 0.8641 |
| Input parameters | No centers | 0.9472 | 0.8641 |
| | No corners | 0.9457 | 0.8591 |
| | No normal | 0.9461 | 0.8598 |
| | No neighbours | 0.9501 | 0.8808 |
| | 1-ring neighbours | 0.9469 | 0.8688 |
| | 2-ring neighbours | 0.9471 | 0.8641 |

Figure 2:
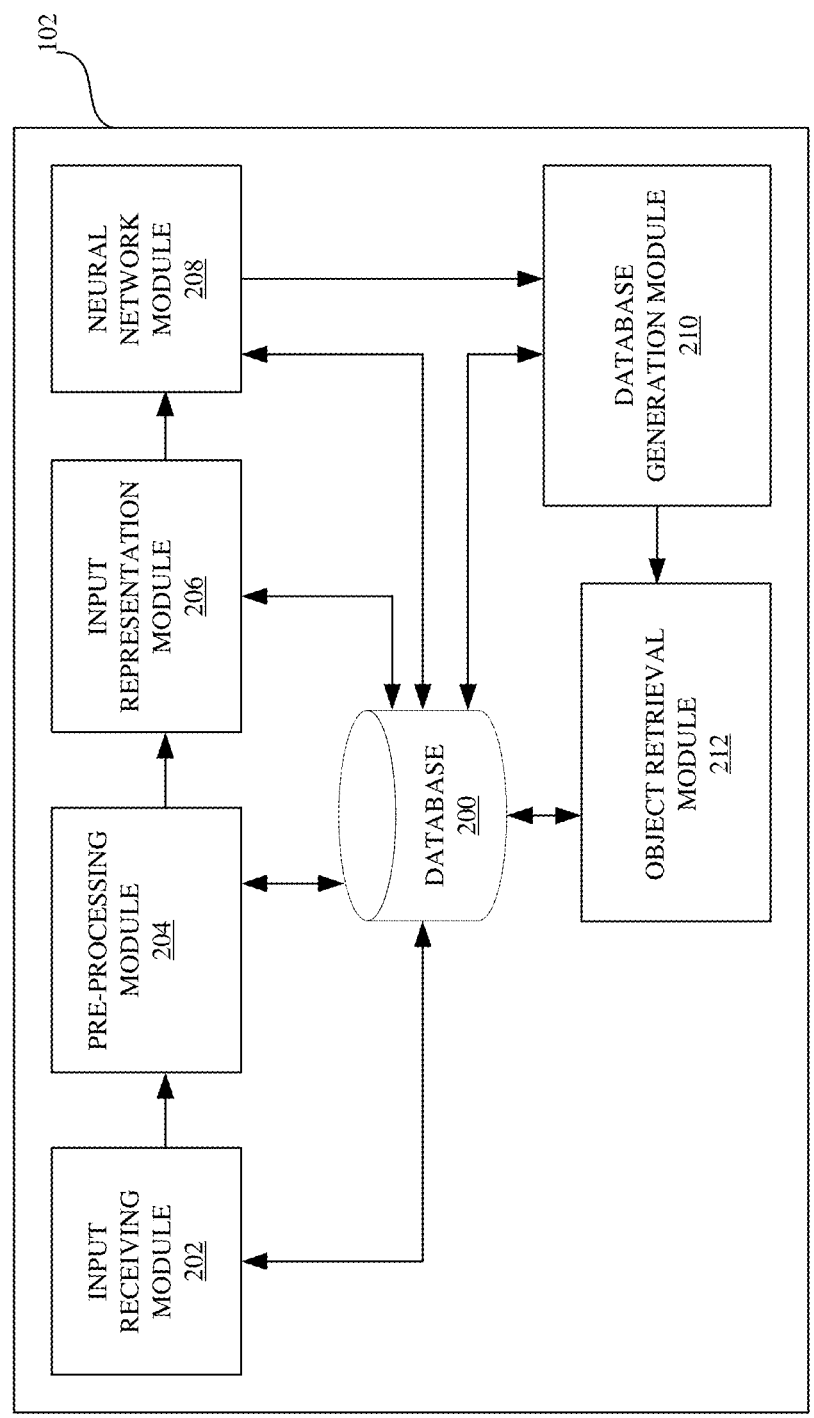
FIG. 2 illustrates a block diagram of the 3D object retrieval server of FIG. 1 according to some embodiments herein.

FIG. 2 illustrates a block diagram of the 3D object retrieval server 102 of FIG. 1 according to some embodiments herein. The 3D object retrieval server 102 includes a database 200, an input receiving module 202, a pre-processing module 204, an input representation module 206, a neural network module 208, a database generation module 210, and an object retrieval module 212. The database 200 may be communicatively connected with one or more modules of the 3D object retrieval server 102.

The input receiving module 202 receives the input data that includes the query object from the user device 104. The database 200 stores the input data. The query object includes a 3D model of the object. The pre-processing module 204 is configured to pre-process the 3D model of the query object to fit into a unit sphere and reduce it to a pre-defined number of triangles. The input representation module 206 is configured to represent each triangle of the triangular mesh including a descriptor as a 2 dimensional (2D) matrix by generating the 2D matrix that represents the 3D model including the 3D model of the object. A number of rows in the 2D matrix is equal to a number of faces in the 3D model being encoded. The neural network module 208 is configured to implement a self-supervised network, to learn feature vectors in a embedding space representing the 3D model of the query object. The neural network model is trained, using the self-supervised network, to embed a plurality of historical 3D models associated with a plurality of historical query objects stored in the database 200 by feeding them through the self-supervised network to obtain their representations in the embedding space for learning. The database generation module 210 is configured to generate the database 200 for retrieval using embedding space by preparing a dataset of inputs and their corresponding feature vectors. The database 200 is generated using the self-supervised network and obtains the embedding vector for each mesh object. The object retrieval module 212 is configured to perform retrieval using the learned embedding space, one or more objects that are geometrically similar to the query object from the database 200 by embedding the pre-processed 3D model of the query object.

Figure 3:
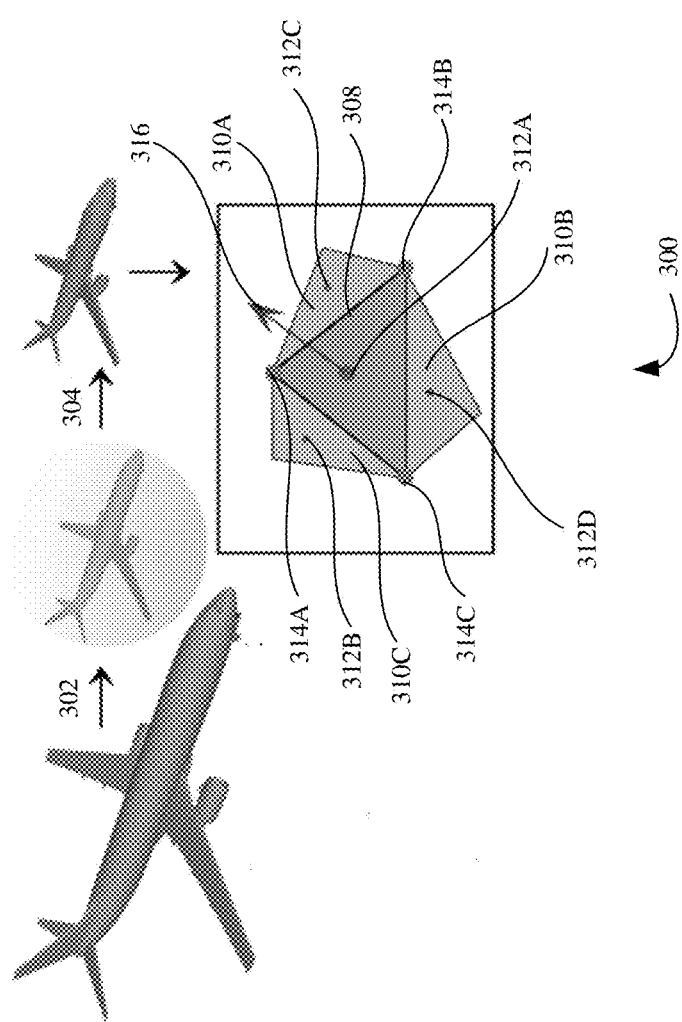
FIG. 3 illustrates pre-processing and input representation comprising of triangle properties in a triangular mesh according to some embodiment herein.

FIG. 3 illustrates pre-processing and input representation 300 comprising of triangle properties in a triangular mesh according to some embodiment herein. The triangular mesh is normalized in size to fit into a unit sphere at step 302. The centre of the object is shifted to the origin. Each mesh is decimated at step 304 to reduce the size of the mesh and the computational cost. Decimation also helps to concentrate on the major shape properties, overlooking fine local variations. An example descriptor of each triangle in the mesh comprises the following components, i.e. centre (312A-D), the (x, y, z) coordinates of the centre of the triangle represent the global structure of the mesh in the 3D space, corners (314A-C), the (x, y, z) coordinates of the three corners of the triangle, a unit normal vector 316, the (x, y, z) coordinates of the unit normal vector directed outwards from the object.

Figure 4:
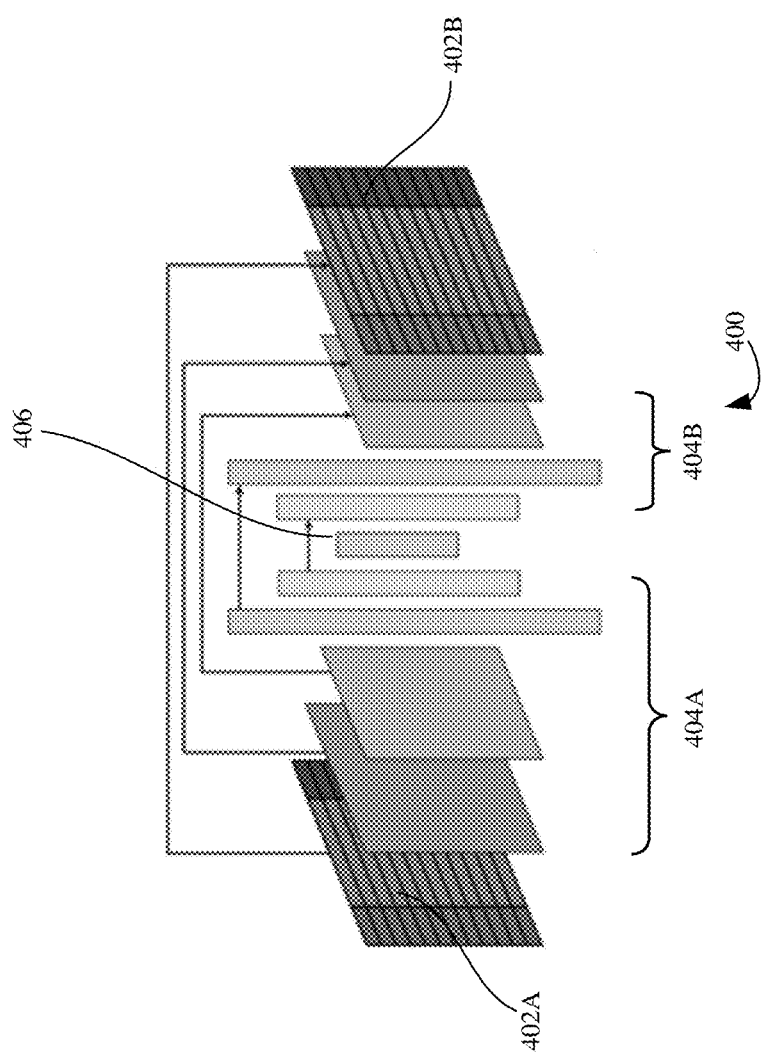
FIG. 4 illustrates the neural network model of the system of FIG. 1 according to some embodiments herein.

FIG. 4 illustrates the neural network model 400 of the system 100 of FIG. 1 according to some embodiments herein. 402A-B represents input representation, 404A-B represents multi-layer perceptron and 406 represents feature vector. The input for a mesh is a list of simple representations of its triangles. A fixed number of network layers of the neural network model 400 are fully connected and the bottleneck layer has a fixed number of dimensions like 256, 512, 1024, etc.

Figure 5:
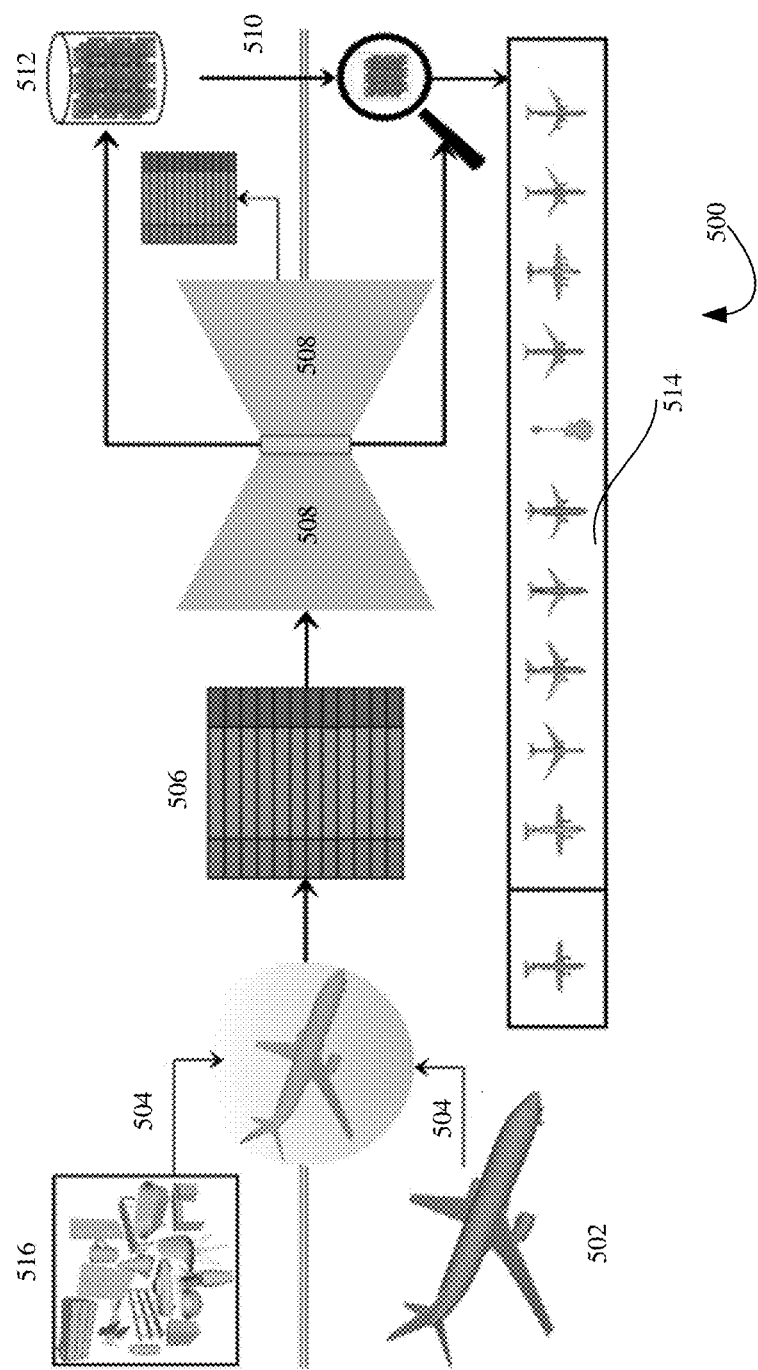
FIG. 5 illustrates a work flow of the system of FIG. 1 according to some embodiments herein.

FIG. 5 illustrates a workflow 500 of the system 100 of FIG. 1 according to some embodiments herein. At step 502, the 3D object retrieval server 102 receives the input data comprising the query object from the user device 104. At step 504, the 3D object retrieval server 102 pre-processes the 3D model of the query object to fit into a unit sphere and reduces it to a pre-defined number of triangles to reduce the size of the 3D model using a training dataset 516. At step 506, the 3D object retrieval server 102 represents each triangle of the triangular mesh including a descriptor as a 2 dimensional (2D) matrix by generating the 2D matrix that represents the 3D model including the 3D model of the object. At step 508, the 3D object retrieval server 102 to employ a neural network model 400, implemented in a self-supervised network, to learn feature vectors in a embedding space representing the 3D model of the query object. The neural network model 400 is trained, using the self-supervised network, to embed a plurality of historical 3D models associated with a plurality of historical query objects stored in a database 200 by feeding them through the self-supervised network to obtain their representations in the embedding space for learning. At step 510, the 3D object retrieval server 102 performs object retrieval using the learned embedding space, one or more objects that are geometrically similar to the query object from the database 200 by embedding the pre-processed 3D model of the query object. The retrieved inputs are then sorted by their distance metric to the pre-processed query input representation, and the top-ranked results are returned as the retrieval results 514.

Figure 6:
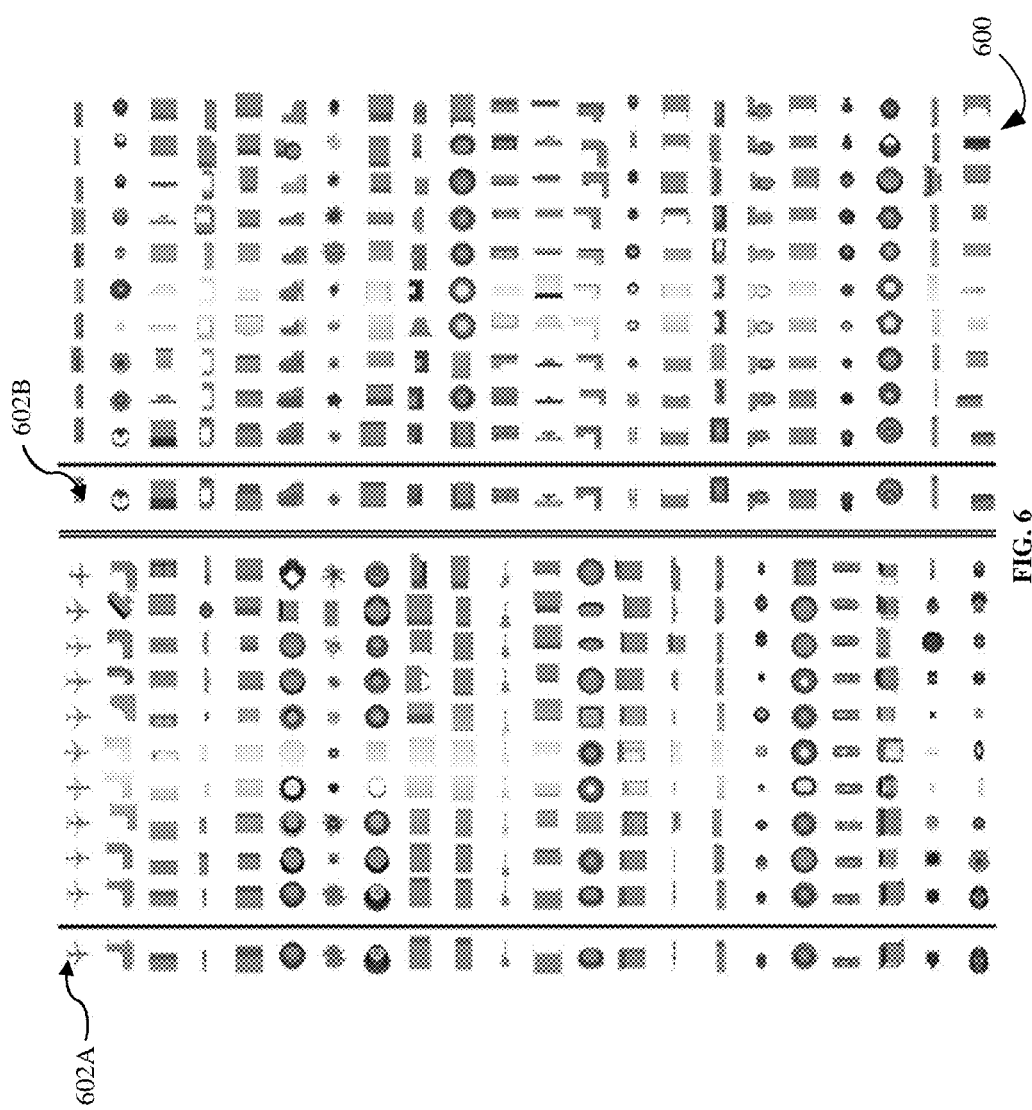
FIG. 6 illustrates retrieval results for different query objects according to some embodiments herein.

FIG. 6 illustrates retrieval results 514 for different query objects 600 according to some embodiments herein. For each query object 602A-B (left column), the 10 closest objects from the database 200 are shown. Left and right halves show 22 different queries each. The models are shown in the top view. FIG. 6 provides the visual result of learning the embeddings to understand the structure and shape of the query objects.

Figure 7:
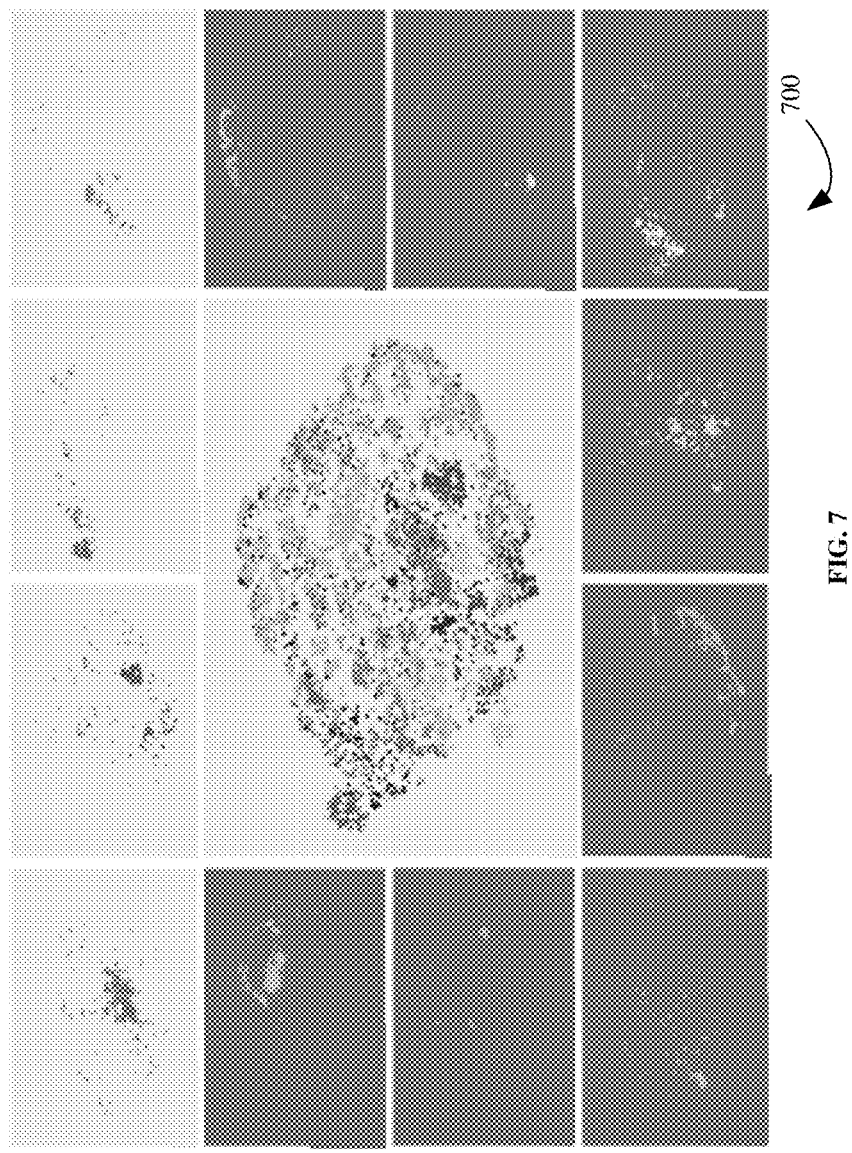
FIG. 7 is a visualization of the embedding space (centre) according to some embodiments herein.

FIG. 7 is a visualization of the embedding space (centre) 700 according to some embodiments herein. To get the class-wise performance, the confusion matrix and t-distributed stochastic neighbor embedding (tSNE) clusters are analyzed. The tSNE clusters of all the object embeddings to visualize the embeddings are generated by the system 100. The individual classes form distinctive clusters. There is a blob seen in each of the class clusters while some of the embeddings are scattered around. This is because every class of objects has a majority of objects with similar shapes while there are outliers which denote the uniqueness in the shape of a few objects. To get the class-wise performance, the confusion matrix and t-distributed stochastic neighbor embedding (tSNE) clusters are analyzed. tSNE clusters of all the object embeddings are analysed to visualize the embeddings generated by the self-supervised model. In the tSNE clusters, furniture objects like sofa, table, night stands, mantel, TV stands, and bookshelf overlap with each other due to their structural similarity. Similarly, flower pot, vase and bottle overlap with each other.

Figure 8:
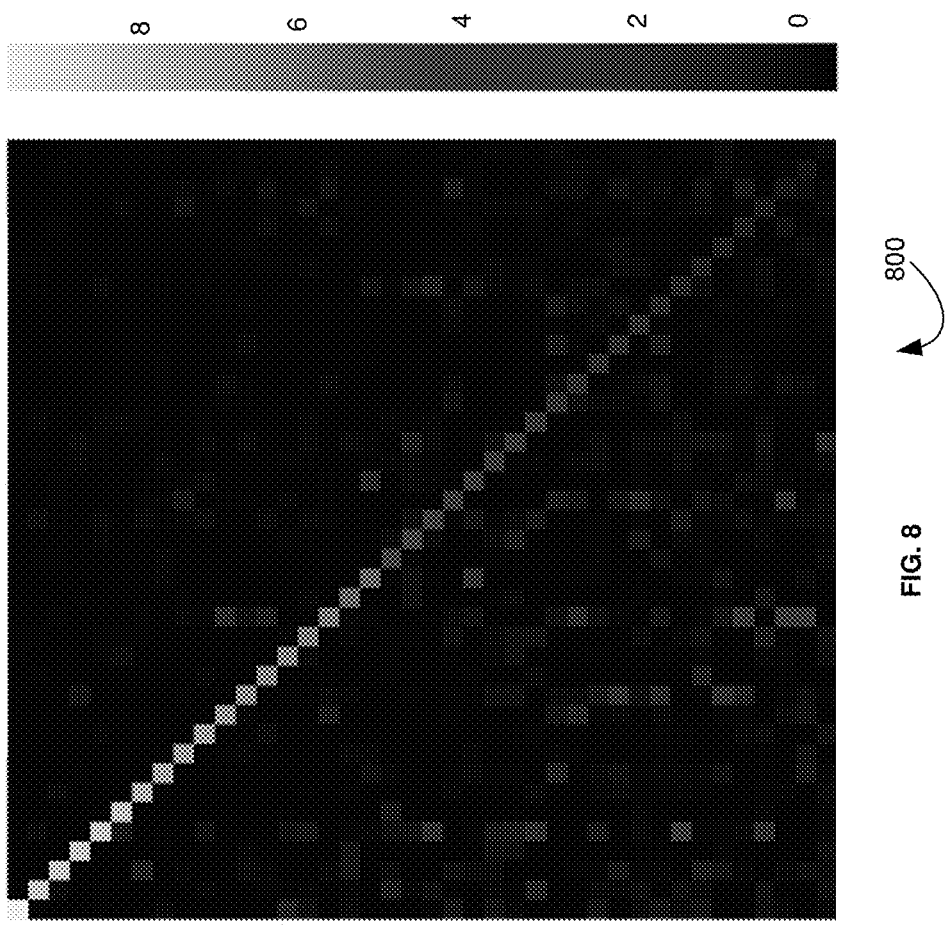
FIG. 8 is a confusion matrix for the top-10 retrieval of the 40 classes of a dataset according to some embodiments herein.

FIG. 8 is a confusion matrix 800 for the top-10 retrieval of the 40 classes of a dataset according to some embodiments herein. The confusion matrix 800 demonstrates the retrieved results against the class labels of the query objects. The order of the class labels is sorted on the basis of normalized retrieved top-10 results of the same class. In the confusion matrix, apart from objects matching their own class, it is seen that they also match visually similar objects. For example, the next top object class label for flowerpot is a vase. As a result, the 3D object retrieval server 102 learns the shape, class, and mainly, visual similarity between different objects. The order of the class labels is sorted on the basis of normalized retrieved top-10 results of the same class. In the confusion matrix, apart from objects matching their own class, it is seen that they also match visually similar objects. For example, the next top object class label for the flowerpot is a vase. As a result, the system 100 learns the shape, class, and mainly, visual similarity between different objects.

Figure 9:
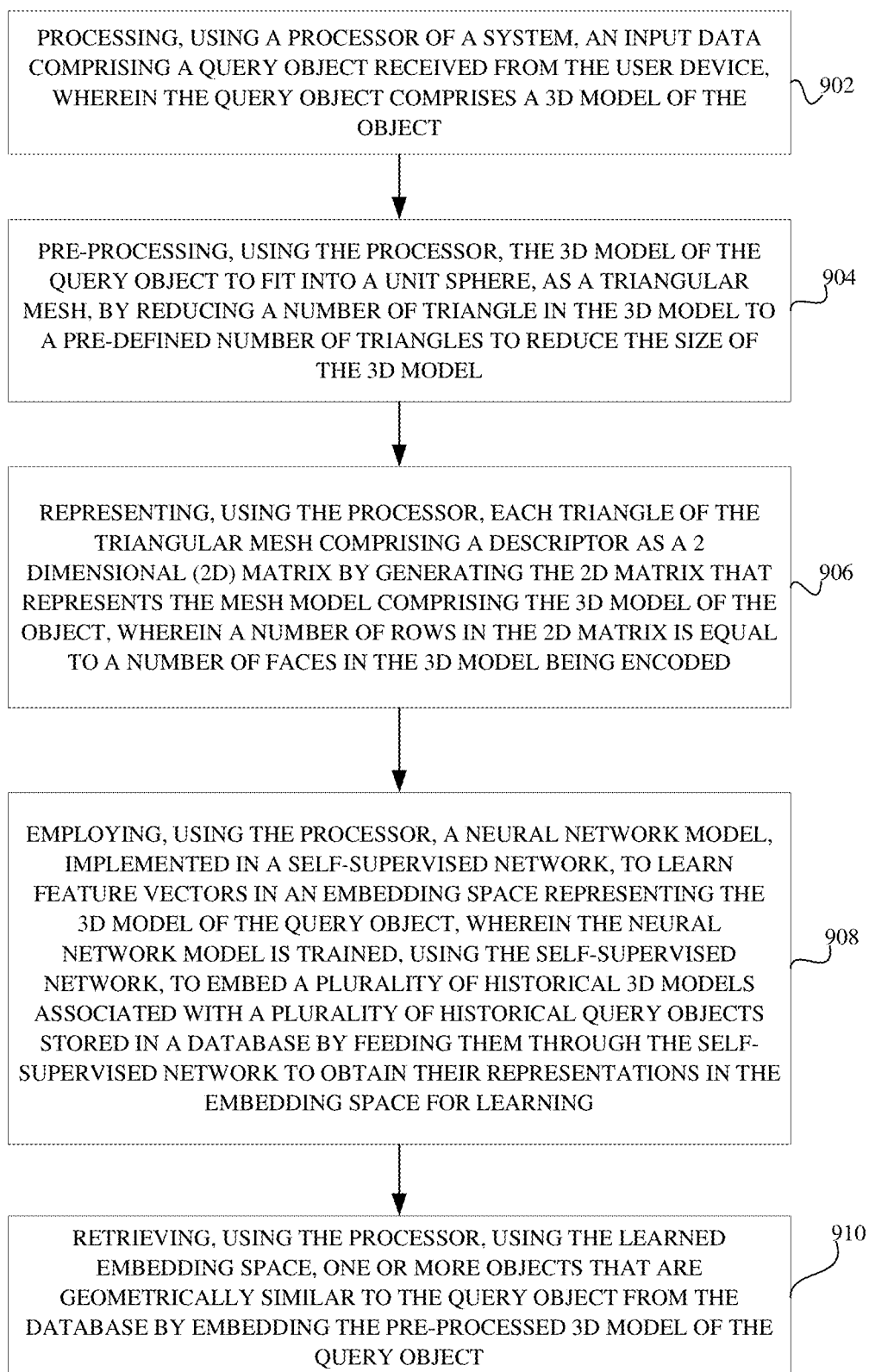
FIG. 9 is a flow diagram that illustrates a method for 3D object retrieval using a self-supervised model according to some embodiments herein.

FIG. 9 is a flow diagram that illustrates a method for 3D object retrieval using a self-supervised model according to some embodiments herein. At step 902, an input data including a query object received from the user device 104 is processed, using a processor 110 of a system 100. The query object includes a 3D model of the object. At step 904, the 3D model of the query object is pre-processed, using the processor 110, to fit into a unit sphere, as a triangular mesh, by reducing a number of triangle in the 3D model to a pre-defined number of triangles to reduce the size of the 3D model. At step 906, each triangle of the triangular mesh including a descriptor is represented, using the processor 110, as a 2 dimensional (2D) matrix by generating the 2D matrix that represents the 3D model including the 3D model of the object. A number of rows in the 2D matrix is equal to a number of faces in the 3D model being encoded. At step 908, a neural network model 400, is employed, using the processor 110, to implement in a self-supervised network, to learn feature vectors in an embedding space representing the 3D model of the query object. The neural network model 400 is trained, using the self-supervised network, to embed a plurality of historical 3D models associated with a plurality of historical query objects stored in a database 200 by feeding them through the self-network to obtain their representations in the embedding space for learning. At step 910, one or more objects is retrieved, using the processor 110, that are geometrically similar to the query object from the database 200 by embedding the pre-processed 3D model of the query object using the learned embedding space.

The 3D object retrieval method learns an embedding for 3D shapes using an appropriate neural network model 400 that is trained using the self-supervision model. The present invention uses triangular meshes of 3D models. The embedding is trained using the 3D object dataset with no role for category labels. The embedding can be used effectively to retrieve the top-k matches from the database 200 of 3D models. A retrieval mAP of 87% for top-10 matches on a dataset, for example, ModelNet40 is achieved. The self-supervised model for 3D mesh objects uses a simple input representation of 3D mesh objects that keeps computation and storage requirements moderate. The present method of 3D object retrieval can scale to larger and more diverse collections easily as the neural network model 400 with fully connected MLPs to learn the embedding space of each object that is trained in a self-supervised manner.

The method of the present retrieves on the basis of the shape of the object to get results that may not belong to the same category but look similar in shape using the embeddings generated by the self-supervised model. The method of the present invention is simple and effective at capturing inherent similarity in shape.

A representative hardware environment for practicing the embodiments herein is depicted in FIG. 10, with reference to FIGS. 1 through 9. This schematic drawing illustrates a hardware configuration of an 3D object retrieval server 102/computer system/computing device in accordance with the embodiments herein. The system includes at least one processing device CPU 10 that may be interconnected via system bus 14 to various devices such as a random-access memory (RAM) 12, read-only memory (ROM) 16, and an input/output (I/O) adapter 18.

The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit.

What is claimed is:

1. A system for retrieving a three-dimensional (3D) object using a self-supervised model, comprising:
   a user device; and
   a 3D object retrieval server that is communicatively connected with the user device through a network, wherein the 3D object retrieval server comprises
   a memory; and
   a processor is configured to
      process an input data comprising a query object received from the user device, wherein the query object comprises a 3D model of the object;
      pre-process the 3D model of the query object to fit into a unit sphere, as a triangular mesh, by reducing a number of triangles in the 3D model to a pre-defined number of triangles to reduce the size of the 3D model;
      represent each triangle of the triangular mesh comprising a descriptor as a 2 dimensional (2D) matrix by generating the 2D matrix that represents the 3D model comprising the 3D model of the object, wherein a number of rows in the 2D matrix is equal to a number of faces in the 3D model being encoded;

employ a neural network model, implemented in a self-supervised network, to learn feature vectors in an embedding space representing the 3D model of the query object, wherein the neural network model is trained, using the self-supervised network, to embed a plurality of historical 3D models associated with a plurality of historical query objects stored in a database by feeding them through the self-supervised network to obtain their representations in the embedding space for learning; and retrieve, using the learned embedding space, plurality of objects that are geometrically similar to the query object from the database by embedding the pre-processed 3D model of the query object.

2. The system of claim 1, wherein the descriptor comprises a centre of the triangle, corners of the triangle, and an unit normal vector of the triangle, wherein x, y, z coordinates of the centre of the triangle represent a global structure of the 3D model in the 3D space, wherein x, y, z coordinates of the triangle represent the three corners of the triangle, and wherein x, y, z coordinates of the unit normal vector directed outwards from the 3D object.

3. The system of claim 1, wherein the learned embedding space processes a large number of datasets efficiently using a nearest neighbour search technique.

4. The system of claim 1, wherein the system retrieves the object that is geometrically similar to the query object by preparing a dataset of inputs and their corresponding feature vectors, generating an embedding vector for each 3D model associated with each object stored in the database, and retrieving the object that is geometrically similar to the query object by embedding the 3D model of the query object and searching the database to determine the object that is similar to the query object.

5. The system of claim 1, wherein the system sorts the plurality of retrieved objects using a distance metric to a pre-processed query input representation, and provides top-ranked retrieved object as the retrieval object, wherein similar objects are represented as vectors that are close to each other in the embedding space, while dissimilar objects are represented far apart.

6. A processor-implemented method for retrieving a three-dimensional (3D) object using a self-supervised model of the system, comprising:

processing, using a processor of a system, an input data comprising a query object received from the user device, wherein the query object comprises a 3D model of the object;

pre-processing, using the processor, the 3D model of the query object to fit into a unit sphere, as a triangular mesh, by reducing a number of triangle in the 3D model to a pre-defined number of triangles to reduce the size of the 3D model;

representing, using the processor, each triangle of the triangular mesh comprising a descriptor as a 2 dimensional (2D) matrix by generating the 2D matrix that represents the 3D model comprising the 3D model of the object, wherein a number of rows in the 2D matrix is equal to a number of faces in the 3D model being encoded;

employing, using the processor, a neural network model, implemented in a self-supervised network, to learn feature vectors in an embedding space representing the 3D model of the query object, wherein the neural network model is trained, using the self-supervised network, to embed a plurality of historical 3D models associated with a plurality of historical query objects stored in a database by feeding them through the self-supervised network to obtain their representations in the embedding space for learning; and retrieving, using the processor, using the learned embedding space, plurality of objects that are geometrically similar to the query object from the database by embedding the pre-processed 3D model of the query object.

7. The processor-implemented method of claim 6, wherein the descriptor comprises a centre of the triangle, corners of the triangle, and an unit normal vector of the triangle, wherein x, y, z coordinates of the centre of the triangle represent a global structure of the 3D model in the 3D space, wherein x, y, z coordinates of the triangle represent the three corners of the triangle, and wherein x, y, z coordinates of the unit normal vector directed outwards from the 3D object.

8. The processor-implemented method of claim 6, wherein the learned embedding space processes a large number of datasets efficiently using a nearest neighbour search technique.

9. The processor-implemented method of claim 6, wherein the method comprises retrieving the object that is geometrically similar to the query object by preparing a dataset of inputs and their corresponding feature vectors, generating an embedding vector for each 3D model associated with each object stored in the database, and retrieving the object that is geometrically similar to the query object by embedding the 3D model of the query object and searching the database to determine the object that is similar to the query object.

10. The processor-implemented method of claim 6, wherein the method comprises sorting the plurality of retrieved objects using a distance metric to a pre-processed query input representation, and provides top-ranked retrieved object as the retrieval object, wherein similar objects are represented as vectors that are close to each other in the embedding space, while dissimilar objects are far apart.

11. One or more non-transitory computer-readable storage mediums storing one or sequences of instructions, which when executed by one or more processors, causes a method for retrieving a three-dimensional (3D) object using a self-supervised model of a system, comprising:

processing, using a processor of a system, an input data comprising a query object received from the user device, wherein the query object comprises a 3D model of the object;

pre-processing, using the processor, the 3D model of the query object to fit into a unit sphere, as a triangular mesh, by reducing a number of triangle in the 3D model to a pre-defined number of triangles to reduce the size of the 3D model;

representing, using the processor, each triangle of the triangular mesh comprising a descriptor as a 2 dimensional (2D) matrix by generating the 2D matrix that represents the 3D model comprising the 3D model of the object, wherein a number of rows in the 2D matrix is equal to a number of faces in the 3D model being encoded;

employing, using the processor, a neural network model, implemented in a self-supervised network, to learn feature vectors in an embedding space representing the 3D model of the query object, wherein the neural network model is trained, using the self-supervised network, to embed a plurality of historical 3D models associated with a plurality of historical query objects stored in a database by feeding them through the self-supervised network to obtain their representations in the embedding space for learning; and retrieving, using the processor, using the learned embedding space, plurality of objects that are geometrically similar to the query object from the database by embedding the pre-processed 3D model of the query object.

12. One or more non-transitory computer-readable storage mediums storing one or sequences of instructions of claim 11, which when executed by one or more processors, wherein the descriptor comprises a centre of the triangle, corners of the triangle and an unit normal vector of the triangle, wherein x, y, z coordinates of the centre of the triangle represent a global structure of the 3D model in the 3D space, wherein x, y, z coordinates of the triangle represent the three corners of the triangle, and wherein x, y, z coordinates of the unit normal vector directed outwards from the 3D object.

13. One or more non-transitory computer-readable storage mediums storing one or sequences of instructions of claim 11, which when executed by one or more processors, wherein the learned embedding space processes a large number of datasets efficiently using a nearest neighbour search technique.

14. One or more non-transitory computer-readable storage mediums storing one or sequences of instructions of claim 11, which when executed by one or more processors, further comprises retrieving the object that is geometrically similar to the query object by preparing a dataset of inputs and their corresponding feature vectors, generating an embedding vector for each 3D model associated with each object stored in the database, and retrieving the object that is geometrically similar to the query object by embedding the 3D model of the query object and searching the database to determine the object that is similar to the query object.

15. One or more non-transitory computer-readable storage mediums storing one or sequences of instructions of claim 11, which when executed by one or more processors, further comprises sorting the plurality of retrieved objects using a distance metric to a pre-processed query input representation, and provides top-ranked retrieved object as the retrieval object, wherein similar objects are represented as vectors that are close to each other in the embedding space, while dissimilar objects are far apart.

* * * * *